Jan. 24, 1967   M. KINN   3,300,632
COMPACT WITH ILLUMINATED MEANS
Filed Aug. 3, 1964   2 Sheets-Sheet 1
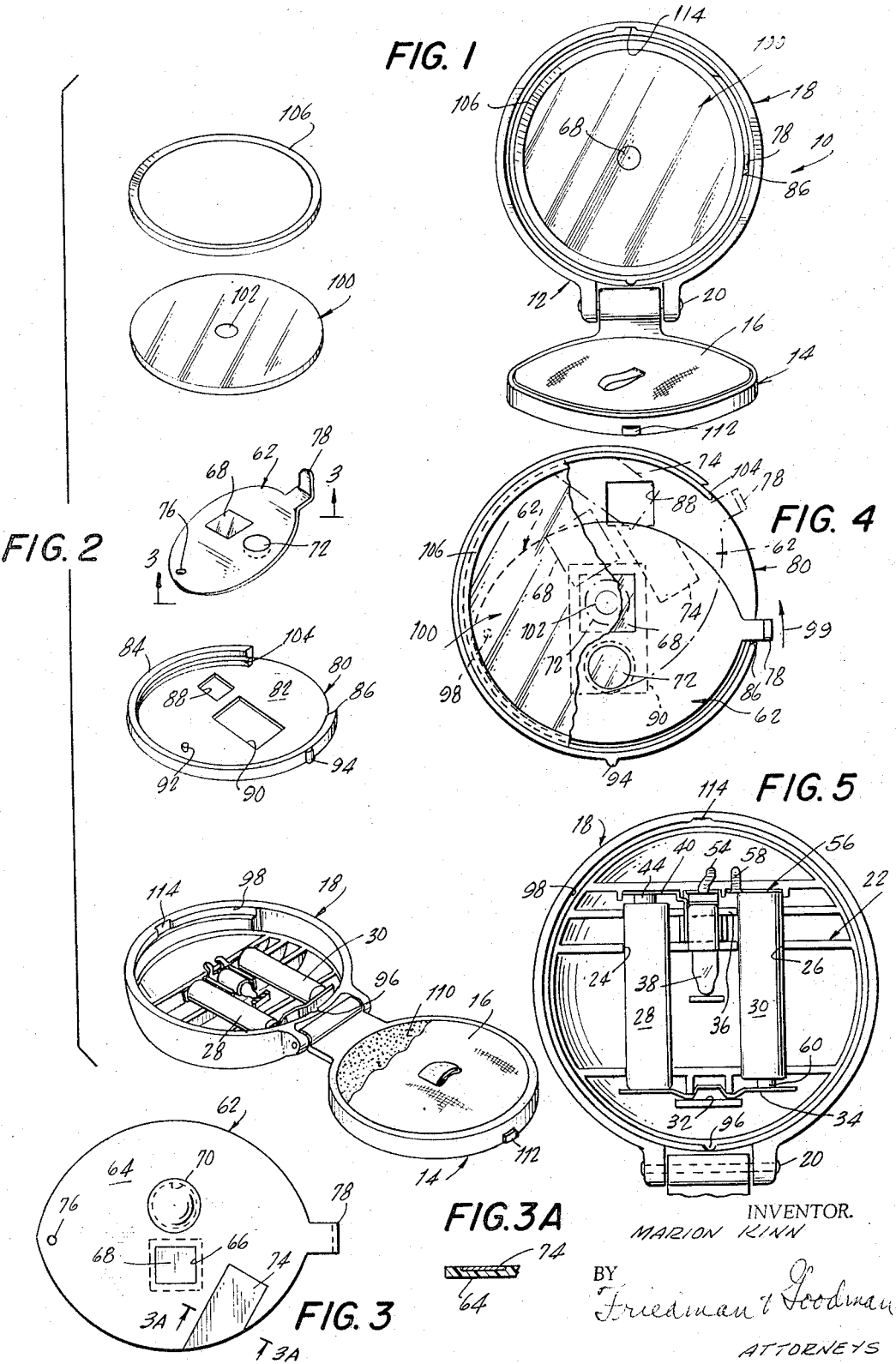
INVENTOR.
MARION KINN
BY Friedman & Goodman
ATTORNEYS Jan. 24, 1967  M. KINN  3,300,632
COMPACT WITH ILLUMINATED MEANS
Filed Aug. 3, 1964  2 Sheets-Sheet 2

INVENTOR.
MARION KINN

BY
Friedman & Goodman
ATTORNEYS

United States Patent Office 3,300,632
Patented Jan. 24, 1967

3,300,632
COMPACT WITH ILLUMINATED MEANS
Marion Kinn, Brooklyn, N.Y., assignor of one-half to
Rose Kinn, Brooklyn, N.Y.
Filed Aug. 3, 1964, Ser. No. 386,844
7 Claims. (Cl. 240—6.45)

The present invention is related in general to compacts or the like and in particular to a self-lighted compact.

It is the object of the present invention to provide a highly novel and efficient self-lighted compact which can be manufactured and sold at a relatively low price and which will have a long and useful ilfe.

It is another object of the present invention to provide in a self-lighted compact which has a highly novel switching arrangement for energizing and de-energizing the light source.

It is another object of the present invention to provide in a self-lighted compact a switching mechanism which cooperates with a transparent portion of the compact mirror to provide for the admission of light through said transparent portion in the energized condition of the light source and to close said transparent portion with a mirrored surface in the de-energized condition of the light source. Other and further objects and advantages of the present invention will be readily apparent to one skilled in the art from a consideration of the following specification taken in connection with the appended drawings which illustrate the best mode presently contemplated for carrying out the invention.

FIGURE 1 is a perspective view of a compact pursuant to the present invention, the compact being shown in the open condition thereof;

FIGURE 2 is an exploded view of a compact pursuant to the present invention;

FIGURE 3 is a plan view of the switching means utilized in the present invention;

FIGURE 3A is a fragmentary sectional view taken on the line 3A—3A of FIGURE 3;

FIGURE 4 is a view illustrating the switching means mounted in position between a switch housing and a compact mirror;

FIGURE 5 is a plan view of a portion of the compact housing which is provided with a light source;

Figure 6:
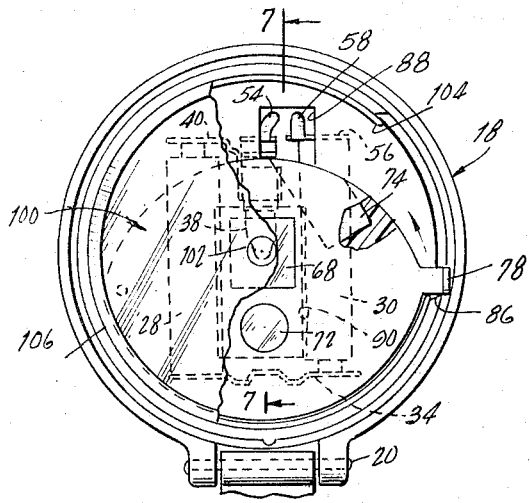
FIGURE 6 is a view similar to FIGURE 5 and includes the mechanism illustrated in FIGURE 4.

Referring now to the drawings in detail, FIGURE 1 shows a compact 10 pursuant to the present invention. The compact is provided with a two part casing or housing 12. The casing 12 comprises a powder tray or receptacle 14 in which there may be removably mounted a powder puff 16 and a mirror housing 18. The casing parts 14 and 18 are pivotally engaged as by a pivot pin 20 so as to open and close the compact in conventional manner.

The mirror housing 18 is of domed or dished construction as best shown in FIGURES 2, 5, 7 and 8. It will be understood that the powder tray 14 and the mirror housing 18 are each preferably of a suitable plastic material. The mirror housing 18 is provided at the inner surface thereof with a grid work which is generally indicated by the reference numeral 22. The grid work 22 defines a first seat 24 and a second seat 26 each generally indicated by the reference numerals thereof. The seats 24 and 26 mount the dry cells or flash light batteries 28 and 30. The grid work 22 also defines a seat generally indicated by the reference numeral 32 in which there is mounted an electrical conductor strip 34. The conductor strip 34 interconnects the batteries 28 and 30 in conventional fashion so that opposite electrodes of the batteries are in electrical contact with and interconnected by the conductor strip 34. The grid work 22 also defines a socket or seat 36 for a light bulb or light source 38. A metallic electrical conductor strip 40 interconnects the body or casing 42 of the bulb 38 and the electrode 44 of the battery 28. A second electrical conductor strip 46 is seated in the bulb socket 36 and is of generally a U shaped conformation. One arm 48 of conductor strip 46 is in electrical contact with the electrode 50 of the light bulb 38 and the second arm 52 of strip 46 is provided with an extension tip 54. Provision is also made for an additional electrical conductor strip 56 which is provided with an extension tip 58. It will be noted that the conductor strip 56 is in electrical contact with the casing of battery 30 which in turn has an electrode 60 which is interconnected by the conducting strip 34 to the casing of the second battery 28. The electrode 44 of battery 28 is interconnected by the conducting strip 40 to the bulb casing 42. It will be noted therefore that the energizing circuit for the light bulb 38 is open between the extension tips 54 and 58 which must be electrically interconnected to energize the light source 38.

In order to effect said interconnection of the contact extensions 54 and 58, provision is made for a switching device 62. As here shown, the switch means 62 comprises a movable plate 64 preferably molded from a suitable plastic material. The plate is provided as here shown with a rectangular opening 66 in which there is seated a mirror 68. The plate is provided also with a circular opening 70 in which there is seated a light lens 72. The plate 64 is provided also on one surface thereof with an electrically conducting metallic strip 74. The substantially oval shape plate 64 is provided also along its elongated access at one end of the access with an aperture 76 and at the other end of its elongated access with a handle extension 78.

The switch device 62 is operatively mounted in a switch casing 80. As here shown, the casing 80 is provided with a circular base or wall 82 provided with a circumferential rim 84 which is interrupted as at 86. The wall 82 is provided with a small rectangular cut out 88 and with a large rectangular cut out 90 and is provided also with a pivot stud 92. The switch casing 80 is provided with a locating projection 94 which is adapted to be received in a recess 96 defined in the rim 98 of the mirror housing 18.

The switch device 62 is assembled with the switch casing 80 for movement relative thereto by inserting the pivot stud 92 through the pivot opening 76. When so assembled, the handle 78 extends through the interrupted portion 86 of the rim 84 so that the switch device 80 is movable in the direction of the arrow 99 in FIGURE 4 from the full line to the broken line position thereof and back again from the broken line to the full line position thereof.

Figure 7:
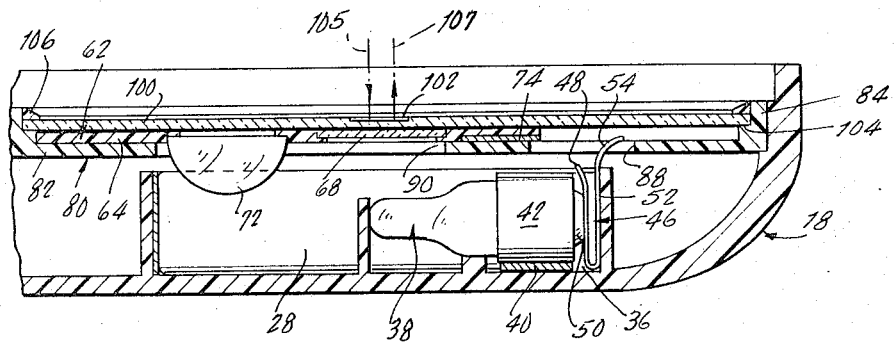
FIGURE 7 is a fragmentary sectional view on an enlarged scale taken on line 7—7 of FIGURE 6, the light source being in the de-energized condition thereof.
Figure 8:
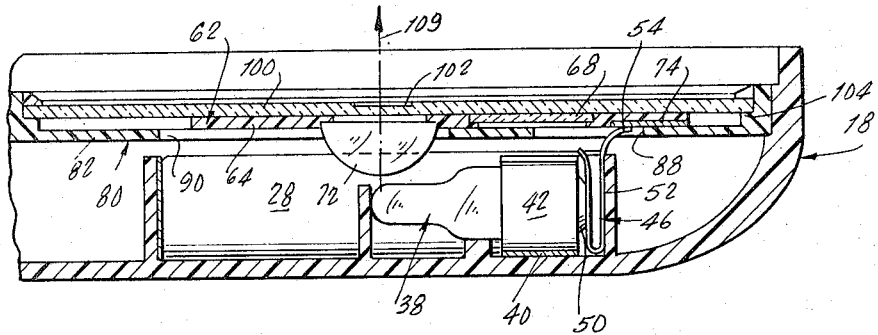
FIGURE 8 is a view similar to FIGURE 7, the light source being in the energized condition thereof.

By reference to FIGURES 7 and 8, it will be noted that when the switch device 62 is seated in the casing 80, the switch device is in surface to surface abutment with the casing and the bulbous lens 72 projects through the enlarged opening 90 provided in the casing 80. Consequently, the lens 72 is free to move within the opening 90 without restricting the movement of the switch device 62.

Provision is made for a circular mirror 100 which is provided with a central circular portion 102 which is not mirrored but is transparent. The previously mentioned rim 84 is provided with a shoulder or ledge 104 and the mirror 100 when seated on the ledge 104 overlies the switch device 62 as best seen in FIGURES 7 and 8. A retainer ring 106 overlies the mirror 100 and securely retains the latter within the switch casing 80.

Figure 9:
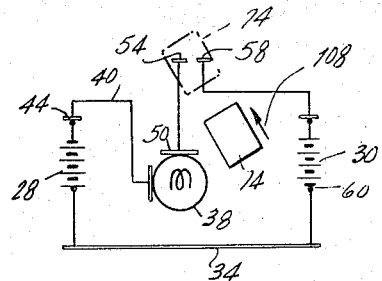
FIGURE 9 is a wiring diagram.

With the switch device in the position thereof shown in FIGURES 4, 6 and 7, it will be noted that the mirrored segment 68 of the switch device 62 is interposed between the light bulb 38 and the transparent portion 102 of the mirror 100. Consequently, an observer looking into the mirror 100 as shown in FIGURE 1 sees what is in effect a complete and continuous mirror since the mirrored segment 68 completes the mirrored surface of the mirror 100 by underlying the transparent portion 102 thereof. Consequently, the mirrored segment 68 serves to reflect an image presented to the mirror as indicated by the arrows 105 and 107 in FIGURE 7. However, when the handle 78 is operated from the full line position thereof shown in FIGURES 4 and 6 to the broken line position thereof shown in said figures, the mirrored segment 68 is moved away from its position underlying the transparent portion 102 to the position thereof shown in FIGURE 8 and the lens 72 is then interposed between the light source or bulb 38 and the transparent portion 102. Said movement of the switch device 62 from the full line to the broken line position thereof is effective also to move the conducting segment 74 carried by the switch device 62 in position wherein it interengages the extension tips 54 and 58, the conducting segment 74 being moved in the direction of the arrow 108 in FIGURE 9 from its full line position through its broken line position wherein it interconnects said extension tips 54 and 58. Therefore, it will be apparent that when the movable conducting segment 74 is in the broken line position thereof shown in FIGURES 4, 6 and 9, and in the position thereof shown in FIGURE 8, the conducting extension tips 54 and 58 are interconnected so as to complete the energizing circuit for the light bulb 38. As a result, the light bulb 38 is energized and the light rays therefrom pass through the lens 72 and through the transparent portion 102 in the mirror 100 as indicated by the arrow 109 in FIGURE 8. This serves to illuminate the face of the user and as a result greatly facilitates the utility of the compact 10. When it is desired to discontinue the use of the light bulb 38, the handle 78 is returned from broken line to the full line position thereof so that the conducting segment 74 is moved out of engagement with the extension tips 54 and 58 and as a result the energizing circuit for the light bulb 38 is interrupted, said movement also causing the lens 72 to move from the position thereof shown in FIGURE 8 to the position thereof shown in FIGURE 7 and also to move the mirror segment 68 from the position thereof shown in FIGURE 8 to the position thereof shown in FIGURE 7.

As previously indicated, the powder tray 14 contains a powder puff 16 and also may contain powder as indicated by the reference numeral 110 in FIGURE 2. The compact 10 is also provided with a closure or latch constituted by an extension 112 provided on the powder tray 14 which is removably engageable in a recess 114 provided in the light casing 18.

As best shown in FIGURE 7, the contact extensions 54 and 58 normally project into and through the opening 88 provided in the base wall 82 of the switch casing 80. Consequently, they may be readily engaged by the electrical contact segment 74 on the switch device 62 when the latter is moved into the position thereof indicated in broken line in FIGURES 4 and 6 and as shown in FIGURE 8.

In view of the foregoing, it will be apparent that there has been illustrated and described a highly novel switching arrangement for a compact or the like. It will be understood that various changes and modifications may be made therein without however departing from the basic inventive concept thereof as set forth in the appended claims.

I claim:

1. In a compact having a powder tray and a mirror housing connected thereto to overlie and to expose the tray, a mirror provided in said housing, said mirror having a transparent portion, a light source provided in said housing behind said mirror, and switch means movable into positions for energizing and de-energizing said light source, said switch means having a mirror segment and a light lens, said mirror segment being disposed behind said transparent portion in the de-energizing position of said switch means, and said lens being disposed behind said transparent portion in the energizing position of said switch means, said light source having a circuit provided with a pair of spaced electrical contact elements, and said switch means having a contact strip which bridges said contact elements in the energizing position of said switch means.

2. In a compact, comprising a powder tray and a mirror housing pivotally connected to said tray, means to mount a lighting circuit in said mirror housing, said circuit including a pair of spaced electrical contact elements, a mirror mounted by said housing, said mirror having a transparent portion, and switch means interposed between said mirror and said circuit, said switch means comprising a plate having an electrical contact strip, a lens and a mirror segment, said plate being movable to and from a first position in which said strip is spaced from said contact elements and said mirror segment underlies said transparent portion and a second position in which said strip bridges said contact elements and said lens underlies said transparent portion.

3. A compact as in claim 2, said lighting circuit including a light source disposed behind said transparent portion.

4. A compact as in claim 2, said switch means having a switch casing on which said switch plate is pivotally mounted, said casing overlying said lighting circuit and having an opening into which said contact elements extend for engagement by said contact strip.

5. A compact as in claim 2, said lighting circuit including a light source disposed behind said transparent portion, said switch means having a switch casing on which said switch plate is pivotally mounted, said casing overlying said lighting circuit and having an opening into which said contact elements extend for engagement by said contact strip, said casing having a second opening which overlies said light source, and said lens extending into said second opening.

6. A compact as in claim 2, said lighting circuit including a light source disposed behind said transparent portion, said switch means having a switch casing on which said switch plate is pivotally mounted, said casing overlying said lighting circuit and having an opening into which said contact elements extend for engagement by said contact strip, said casing having a second opening which overlies said light source, and said lens extending into said second opening, said mirror being mounted by said switch casing.

7. A compact as in claim 2, said lighting circuit including a light source disposed behind said transparent portion, said switch means having a switch casing on which said switch plate is pivotally mounted, said casing overlying said lighting circuit and having an opening into which said contact elements extend for engagement by said contact strip, said casing having a second opening which overlies said light source, and said lens extending into said second opening, said mirror being mounted by said switch casing, said switch plate having a handle extension which is accessible outwardly of said switch casing and said mirror.

References Cited by the Examiner
UNITED STATES PATENTS

| | | | |
|---|---|---|---|
| 2,468,248 | 4/1949 | Wachtel | 240—6.45 |
| 2,580,258 | 12/1951 | Tarasuk | 240—4.2 |
| 2,879,379 | 3/1959 | Lyons | 240—6.45 X |

JOHN M. HORAN, *Primary Examiner.*

NORTON ANSHER, *Examiner.*

CHARLES C. LOGAN II, *Assistant Examiner.*